(12) United States Patent
Marukawa et al.

(10) Patent No.: US 8,701,810 B2
(45) Date of Patent: Apr. 22, 2014

(54) BATTERY PACK

(75) Inventors: Shuhei Marukawa, Toyohashi (JP); Toyohiko Eto, Toyota (JP); Masahiro Misu, Nisshin (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1242 days.

(21) Appl. No.: 11/642,607

(22) Filed: Dec. 19, 2006

(65) Prior Publication Data

US 2007/0141454 A1    Jun. 21, 2007

(30) Foreign Application Priority Data

Dec. 20, 2005   (JP) .................................. 2005-366901

(51) Int. Cl.
*B60K 11/06*   (2006.01)
*B60K 1/04*   (2006.01)

(52) U.S. Cl.
USPC ....... 180/68.1; 180/68.5; 180/65.1; 180/68.2; 429/99

(58) Field of Classification Search
USPC ........... 429/152, 153, 99; 62/239, 244, 259.2; 180/68.1, 68.5, 65.1, 68.2
See application file for complete search history.

(56) References Cited

U.S. PATENT DOCUMENTS

| | | | |
|---|---|---|---|
| 6,094,927 A * | 8/2000 | Anazawa et al. | 62/239 |
| 6,662,891 B2 * | 12/2003 | Misu et al. | 180/68.1 |
| 7,045,236 B1 * | 5/2006 | Andrew et al. | 429/26 |
| 2002/0093299 A1 * | 7/2002 | Kobayashi et al. | 318/34 |

FOREIGN PATENT DOCUMENTS

| | | | |
|---|---|---|---|
| JP | 10-278596 A | 10/1998 | |
| JP | 2002-84604 A | 3/2002 | |
| JP | 2003-100272 A | 4/2003 | |
| JP | 2004-106807 | 4/2004 | |
| JP | 2004-179102 | * 6/2004 | .............. H01M 8/04 |

OTHER PUBLICATIONS

Notice of Grounds for Rejection mailed May 24, 2011, in corresponding Japanese Application No. 2005-366901, filed Dec. 20, 2005, 7 pages.

* cited by examiner

*Primary Examiner* — Helen O Conley
(74) *Attorney, Agent, or Firm* — Christensen O'Connor Johnson Kindness PLLC

(57) ABSTRACT

A battery pack to be mounted on a vehicle. The battery pack has a battery stack. A cooling fan, a fan relay, and a main relay (−) are disposed on one side of the battery stack. A control module, a register, a main relay (+), and a pre-charge relay are disposed on the other side of the same. As a result of devices being disposed on both sides of the battery stack, the weight of the battery pack is adjusted to the neighborhood of the center of the battery pack.

5 Claims, 6 Drawing Sheets

BATTERY PACK

PRIORITY INFORMATION

This application claims priority to Japanese Patent Application No. 2005-366901, filed on Dec. 20, 2005, which is incorporated herein by reference in its entirety.

BACKGROUND OF THE INVENTION

1. Field of the Invention

The present invention relates to a battery pack, and more particularly, to the structure of a battery pack mounted in a vehicle.

2. Related Art

A battery pack is mounted on a hybrid electric vehicle, a fuel-cell-powered vehicle, or an electric vehicle for storing power to be supplied to a drive motor. A battery pack as a battery stack, and an equipment box with various pieces of equipment used for controlling the battery stack incorporated therein.

FIG. 7 shows a plan view of a related-art battery pack 10. A battery stack 20 is formed by means of stacking a plurality of single cells, each of which is formed from a nickel-metal hydride battery, a lithium ion battery, or the like. An equipment box 40 is located adjacent to the battery stack 20. The equipment box is provided with a control module used for controlling recharging-and-discharging operation of the battery stack 20 and a register, as well as a main relay.

However, in the case of a configuration where the equipment box 40 is located on one side of the battery stack 20, since the battery stack 20 is heavier than the equipment box 40, the centroid of the entire battery pack 10 is biased towards the battery stack 20, which creates an imbalance in the weight of the vehicle when the battery stacked 20 is mounted in the vehicle.

FIG. 8 shows that the battery pack 10 shown in FIG. 7 is mounted in the vehicle 1. When the battery pack 10 is mounted in such a way that the longitudinal direction of the battery pack 10 coincides with the width of the vehicle, the position of centroid Pg of the battery pack 10 deviates to the battery pack 20, thereby deteriorating a lateral weight balance.

Against this backdrop, a method for ensuring a weight balance has hitherto been put forward. For instance, Japanese Patent Laid-Open Publication No. 2004-106807 discloses an attempt to divide into two sub-divisions a battery unit which supplies a drive motor with power. The two split battery units are arranged in the vehicle such that one unit is located on the left side, and the other unit is located on the right side, thereby realizing an attempt to make the weight balance of the vehicle uniform.

FIG. 9 shows the arrangement of a battery. A battery 100 is split into two battery units 100$a$ and 100$b$. The battery unit 100$b$ is placed rearward of position S below the rearmost seat of a hybrid electric vehicle 250; namely, a position above a tire house 260 and between one vehicle sidewall 210 of a luggage compartment 270 and one interior wall 220. The battery unit 100$a$ is located at a position above the tire house 260 and between the other vehicle sidewall 230 and the other interior wall 240. A low-potential battery 90 is located in close proximity to either the battery unit 100$a$ or the battery unit 100$b$. In order to achieve balanced distribution of the right and left weights of the hybrid car 250, a DC-DC converter 140 is located at a position between the vehicle sidewall opposite the position where the low-potential battery 90 is placed, and the interior wall. The battery units 100$a$, 100$b$ are connected in series with the DC-DC converter 140 via a wiring box, and the low-potential battery 90 is also connected in series with the DC-DC converter.

However, dividing the battery into two battery units and placing the battery units on the respective sides of the vehicle leads to an excessive increase in the number of components and a necessity for additional provision of a wiring box used for connecting the two battery units in series with each other. Thus, efforts required to place the divided battery units become useless. Consequently, even when a single enclosure is maintained as a battery pack and mounted in a vehicle, a structure for preventing occurrence of an imbalance in the weight of the vehicle is strongly desired.

SUMMARY OF THE INVENTION

The present invention provides a battery pack which maintains the unity or integrity of an enclosure and exhibits excellent weight balance.

The present invention provides a battery pack to be mounted on a vehicle, comprising: a battery stack; and an equipment box, wherein the equipment box is formed from a first box and a second box, and the first and second boxes are disposed separately on respective sides of the battery stack.

In an embodiment of the present invention, the first box has a fan which supplies a medium used for adjusting the temperature of the battery stack; and the second box has a control module for controlling charging/discharging operations of the battery stack.

In the present invention, an equipment box is divided into two sub-divisions, and the sub-divisions are separately disposed on respectively sides of a battery stack rather than the equipment box being disposed only on one side of the battery stack. Accordingly, the centroid of the battery pack can be adjusted while the integrity of the battery pack is maintained. For example, the centroid of the battery pack can be adjusted to the vicinity of the center of the battery pack. As a result, when the battery pack is mounted on the vehicle, the battery pack can be adjusted so as to come to the longitudinal centerline of the vehicle.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

An embodiment of the present invention will be described hereinbelow by reference to the drawings.

Figure 1:
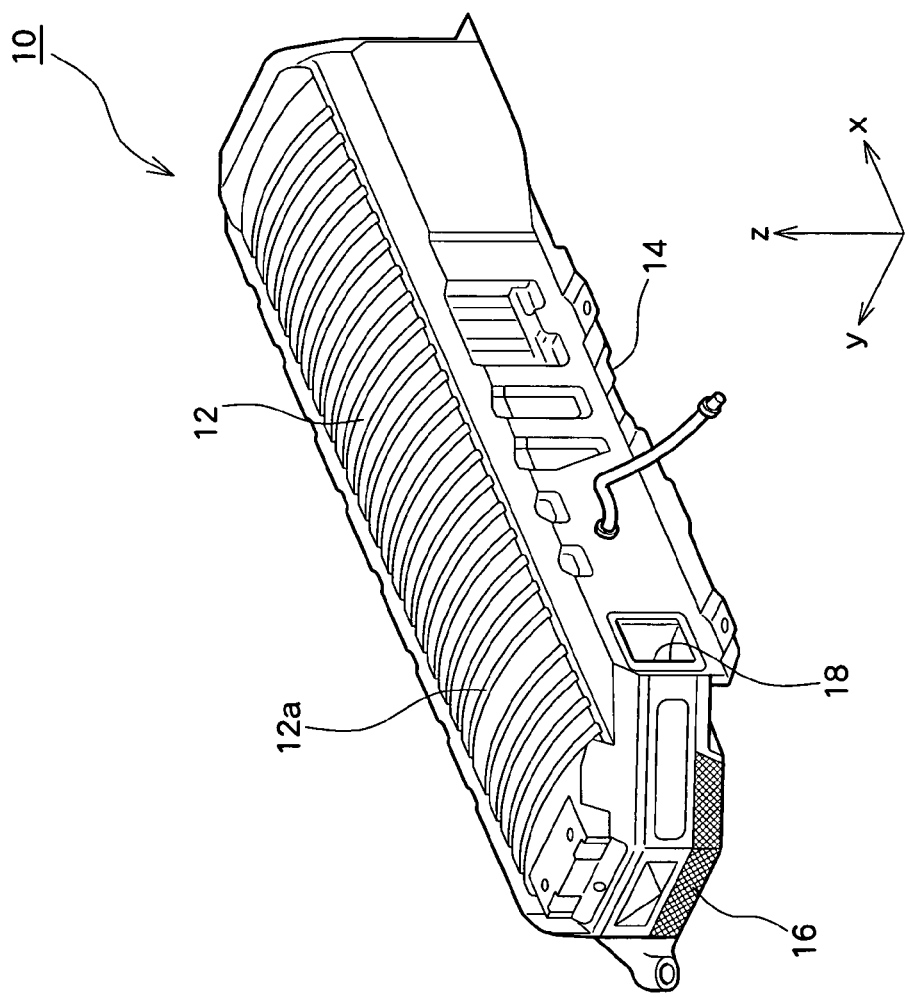
FIG. 1 is a perspective view of a battery pack of an embodiment of the present invention.

FIG. 1 is an external perspective view of a battery pack 10 according to a present embodiment. A battery case, which is an enclosure of the battery pack 10, has an upper case 12 for covering an upper portion of a battery stack and a lower case 14 for covering a lower portion of the same. The battery pack 10 has a built-in battery assembly (a battery stack). A plurality of battery modules, each formed from one or a plurality of unit cells such as a nickel-metal hydride battery or the like, are arranged (stacked) in parallel while a cooling passage is formed so as to pass through the modules. End members provided at both ends of the cooling passage are assembled in a tied manner, thereby forming the battery assembly where battery modules are electrically connected in series with each other. Moreover, a cooling fan is disposed in the battery pack 10. An air intake 16 is formed in one side face of the battery pack 10; preferably, a face opposing a cooling fan, and the air intake 16 is equipped with a grid-shaped louver for preventing intrusion of extraneous matter. Another filter may also be additionally disposed on the inside of the air intake 16. An air outlet 18 is formed in the other side face of the battery pack 10. When the cooling fan is rotationally driven, the air in a passenger compartment is taken in via the air intake 16. The thus-taken air is supplied to a chamber space formed between the battery stack and the lower case 14. The air then flows from a lower portion of the battery stack to an upper portion thereof, to thus reach a chamber space defined between the battery stack and the upper case 12 and escape to the outside from the air outlet 18.

The upper case 12 of the battery pack 10 is not a planar surface, but has a predetermined curvature so as to face and protrude upward from the battery pack 10, thereby assuming the shape of an arch or a protruding surface. Moreover, the upper case 12 has groove-shaped bead portions 12a which are formed so as to protrude toward the inside of the battery pack 10. As illustrated, on the assumption that the longitudinal direction of the battery pack 10 is direction "x," the widthwise direction of the same perpendicular to the direction "x" is direction "y," and the heightwise direction of the same is taken as direction "z," the curvature of the upper case 12 is formed within a plane y-z, and the bead portions 12a are also provided along the plane y-z. When the battery pack 10 is mounted in the vehicle in such a way that the longitudinal direction of the battery pack 10 coincides with the widthwise direction of the vehicle, the direction "x" coincides with the widthwise direction of the vehicle; the direction "y" coincides with the longitudinal direction of the vehicle; and the direction "z" coincides with the heightwise direction of the vehicle. The curvature of the upper case 12 is set in the longitudinal direction of the vehicle. A direction in which the battery stacks are arranged corresponds to the longitudinal direction; namely, the direction "x." The curvature of the upper case 12 can be said to be provided in a direction perpendicular to the arrangement direction. The rigidity of the battery pack 10 against the upward load can be enhanced by means of the shape of an arch and the bead portions 12a.

Figure 2:
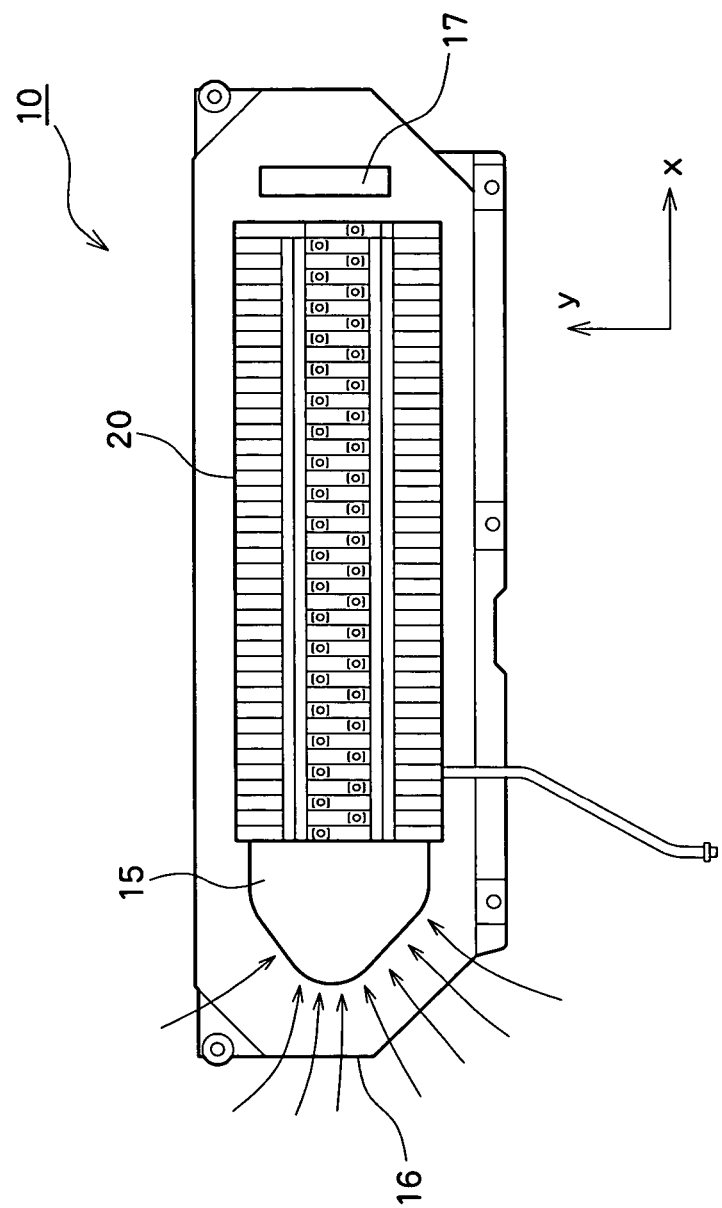
FIG. 2 is a descriptive view of the internal status of the battery pack.

FIG. 2 shows the internal structure of the battery pack 10 from which the upper case 12 has been removed. A battery stack 20 is formed by means arranging battery modules into a plurality of layers in the longitudinal direction (the direction "x") of the battery pack 10. In the present embodiment, the battery module includes an integral case which is an exterior member of the module, and six battery cells which are disposed in the integral case and separated from each other with partitions. The integral case is not particularly limited, but is made from, e.g., a resin. The six battery cells included in the battery module are electrically connected in series within the integral case.

A cooling fan 15 for supplying a cooling air is placed at one end of the battery stack 20 along the direction X, and a control module 17 for controlling charging/discharging operations of the battery stack 20 is placed at the other end. The control module 17 has a microprocessor; establishes data communication with a computer to be mounted in a vehicle; and transmits status data, such as the voltage, the current, the temperature, and the SOC (State of charge) of the battery stack 20, and the like, to the vehicle computer. In response to a command from the vehicle computer, the control module 17 controls the battery stack 20. Specifically, the control module 17 controls the flow rate of the cooling fan, thereby retaining the battery stack 20 in a predetermined temperature range. Moreover, the control module 17 controls activation/deactivation of a main relay (+) 28, a main relay (−) 24, and a pre-charge relay 29. The air intake 16 covered with the grid-shaped louver is disposed in front of the cooling fan 15. By means of driving the cooling fan 15, the cooling air is taken in from the passenger compartment as illustrated by the arrow in the drawing. The cooling air is supplied to a chamber space formed between the lower portion of the battery stack 20 and the lower case 14 via an internal duct; flows through the battery stack 20 from below to up (in a direction perpendicular to a sheet) to reach a chamber space formed between an upper portion of the battery stack 20 and the upper case 12, thereby cooling the battery stack 20 with a desired cooling characteristic. In FIG. 1, the curve formed in the upper case 12 is formed over the entirety of the battery pack 10 with respect to the longitudinal direction. However, it may be the case that the curve is formed in only an area located immediately above the battery stack 20. Specifically, an area of the upper case 12 located immediately above the battery stack 20 is formed into a curve, and another area of the upper case 12 located immediately above the cooling fan 15 or the control module 17 may also be formed into a plane surface.

Figure 3:
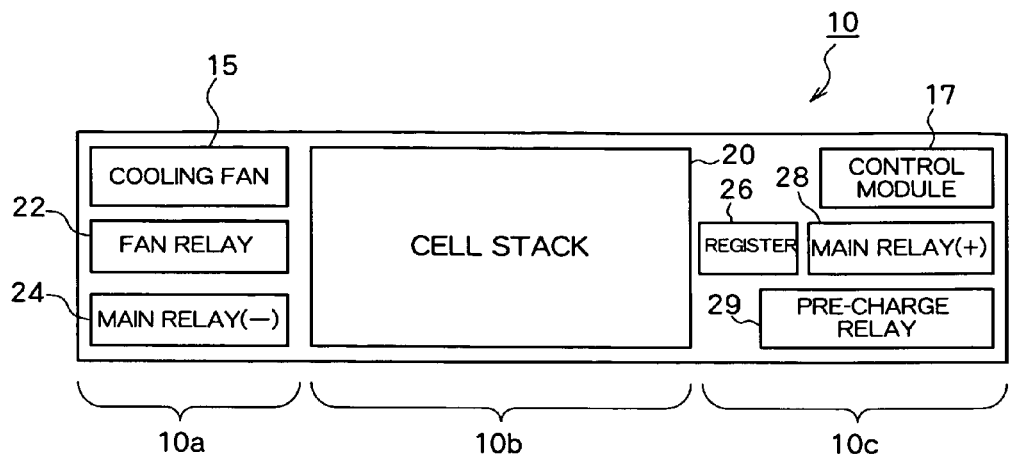
FIG. 3 is a functional block diagram of the battery pack.

FIG. 3 shows a functional block diagram of the battery pack 10. As mentioned above, the cooling fan 15 and the control module 17 are disposed at respective longitudinal ends of the battery stack 20. As a result of the cooling fan 15 and the control module 17 being located on either side of the battery stack 20, the balanced weight of the battery pack 10 can be ensured. A fan relay 22 and a negative electrode (−) of the main relay 24 are disposed in the vicinity of the cooling fan 15. A register 26 and a positive electrode (+) 28 of the main relay are disposed in the vicinity of the control module 17. Further, a relay 29 for pre-charging purpose is also disposed.

In the present embodiment, various devices used for controlling the battery stack 20 are located on both sides of the battery stack 20. Accordingly, the battery pack 10 is broadly constituted of three functional regions. Namely, a battery stack region 10b located in the center of the battery pack 10; a first equipment region 10a located on the left side of the battery stack region 10b; and a second equipment region 10c located on the right side of the battery stack region 10b. The weight of the cooling fan 15 and that of the control module 17 are essentially equal to each other. In precise terms, there stands a relationship of (the weight of the cooling fan)>(the weight of the control module). The register 26 and the pre-charge relay 29 are disposed in the second equipment region 10c, to thus add their weights to the second equipment region 10c. As a result, settings can be made to such an extent that an essential relationship of (the weight of the first equipment region 10a)=(the weight of the second equipment region 10c) can be achieved; namely, that both the first and second equipment regions can be deemed to be essentially equal in weight to each other. The centroid of the battery pack 10 can be set in the vicinity of the center of the battery pack 10. Whether or not the first and second equipment regions are essentially equal in weight to each other is determined by means of a determination as to whether or not a difference between the weights of the first and second equipment regions affects the balance of the weight of the vehicle when the battery pack is mounted on the vehicle.

Figure 4:
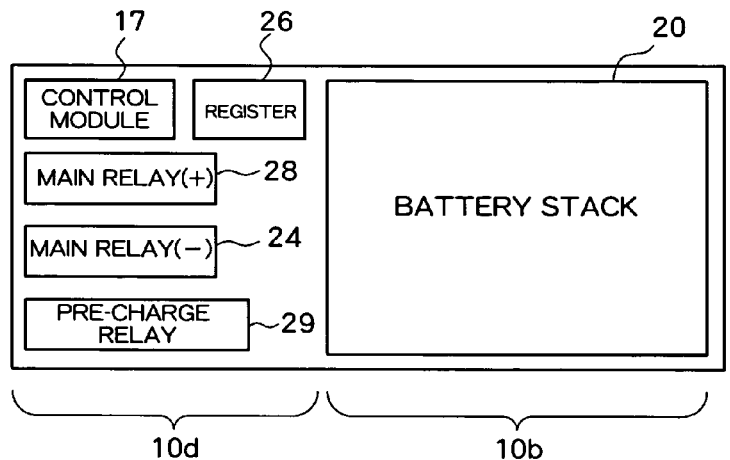
FIG. 4 is a functional block diagram of a related-art battery pack.
Figure 7:
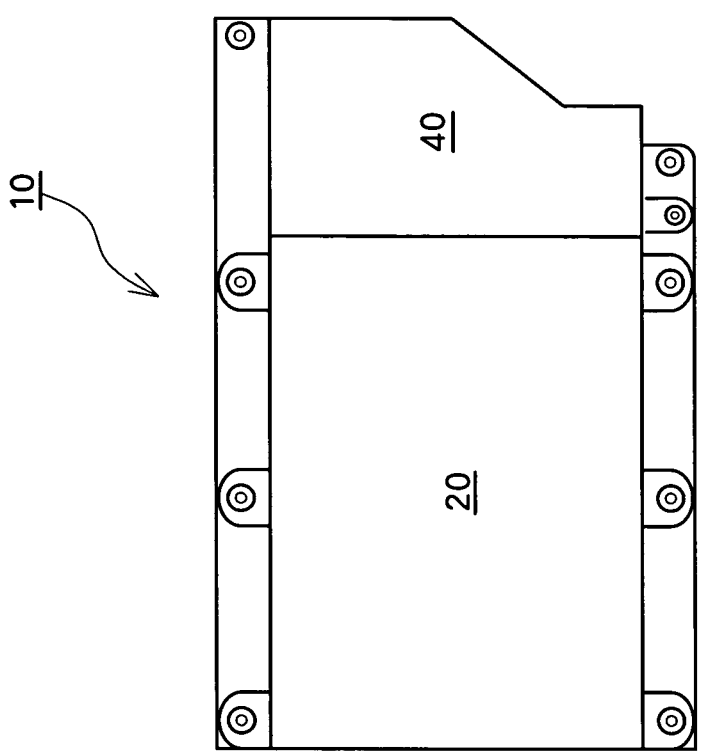
FIG. 7 is a block diagram of the related-art battery pack.

FIG. 4 shows a functional block diagram corresponding to the related-art battery pack 10 shown in FIG. 7. By means of a comparison between FIGS. 3 and 4, the superiority of the present embodiment becomes evident. The equipment box 40 is disposed adjacent to one side of the battery stack 20. The control module 17, the register 26, the main relay (+) 28, the main relay (−) 24, the pre-charge relay 29, and the like, are provided within the equipment box 40. The cooling fan is provided separately from the battery pack 10 and located at a position separated from the battery pack 10. Hence, the cooling fan is not present as a functional block. Provided that the functional region of the equipment box 40 is taken as an equipment region 10d, there stands a relationship of (the weight of the battery stack region 10b)>>(the weight of the equipment region 10d). The centroid of the battery pack 10 is biased toward the battery stack 20. The battery pack 10 of the present embodiment can be said to ensure a weight balance by means of: disposing the cooling fan 15 in the battery pack 10 rather than outside of the same; and dividing the equipment box including the cooling fan 15 into two sub-divisions and placing the sub-divisions on both sides of the battery stack 20. In the configuration where the cooling fan 15 is disposed outside the battery pack 10 and where the cooling air is guided to the inside of the battery pack 10 by means of the duct, the presence of the duct hinders arrangement of the equipment box on the side of the battery pack 10 from which the cooling air is taken in. Therefore, there is no alternative but to locate the equipment box on one side of the battery stack 20. In the present embodiment, the cooling fan 15 is built in the battery pack 10, thereby eliminating such restrictions and enabling arrangement of the equipment boxes on both sides of the battery stack 20. As a matter of course, from the viewpoint of merely ensuring a weight balance, placing a weight on the right side of the battery stack 20 in the functional block diagram of FIG. 4 is also conceivable. Needless to say, this idea induces a mere increase in the size and weight of the battery pack 10, and cannot be applied to a battery pack to be mounted in a vehicle.

Figure 5:
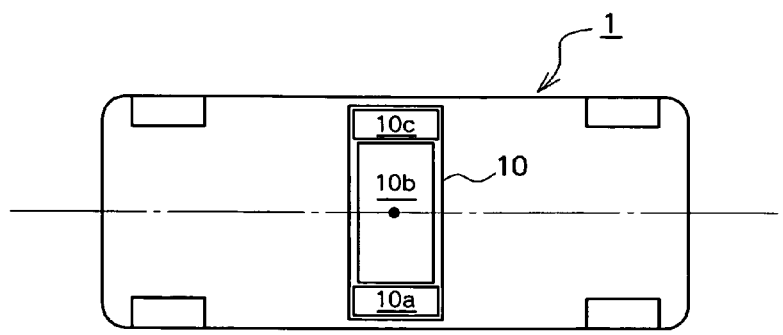
FIG. 5 is a descriptive view in relation to mounting of a battery pack on a vehicle.
Figure 8:
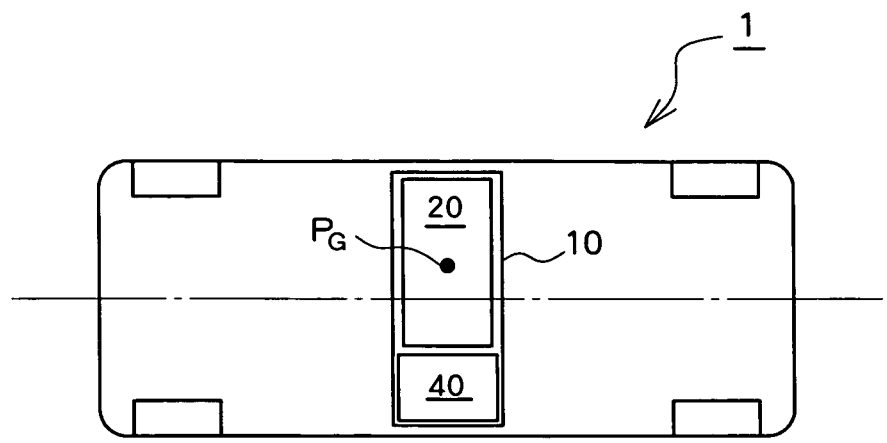
FIG. 8 is a descriptive view in relation to mounting of the related-art battery pack on a vehicle.
Figure 9:
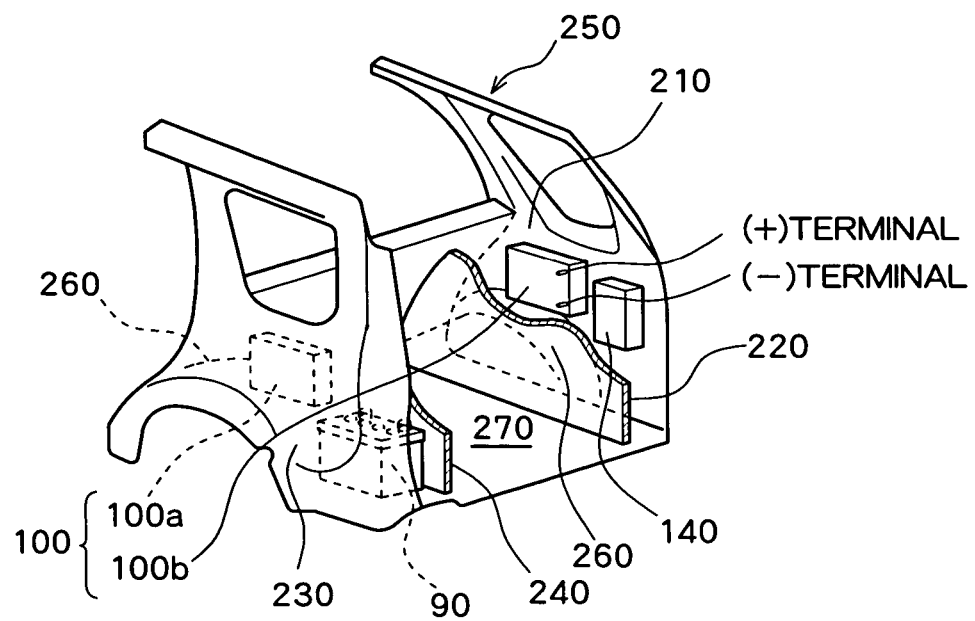
FIG. 9 is a perspective view showing the status of the related-art battery pack mounted on the vehicle.

FIG. 5 shows that the battery pack 10 of the present embodiment is mounted on the vehicle 1, corresponding to FIG. 8, which shows the mounted state of the related-art battery pack. The battery pack 10 is formed from three functional regions; namely, the first equipment region 10a; the battery stack region 10b; and the second equipment region 10c. The battery pack 10 is mounted such that the longitudinal direction of the battery pack 10 coincides with the widthwise direction of the vehicle 1. The centroid of the battery pack 10 is located in the vicinity of the center of the battery pack 10, and hence the centroid of the battery pack 10 is located along the longitudinal centerline of the vehicle 1 as illustrated. Thus, the lateral weight balance of the vehicle 1 is not disturbed when the battery pack 10 is mounted.

Figure 6:
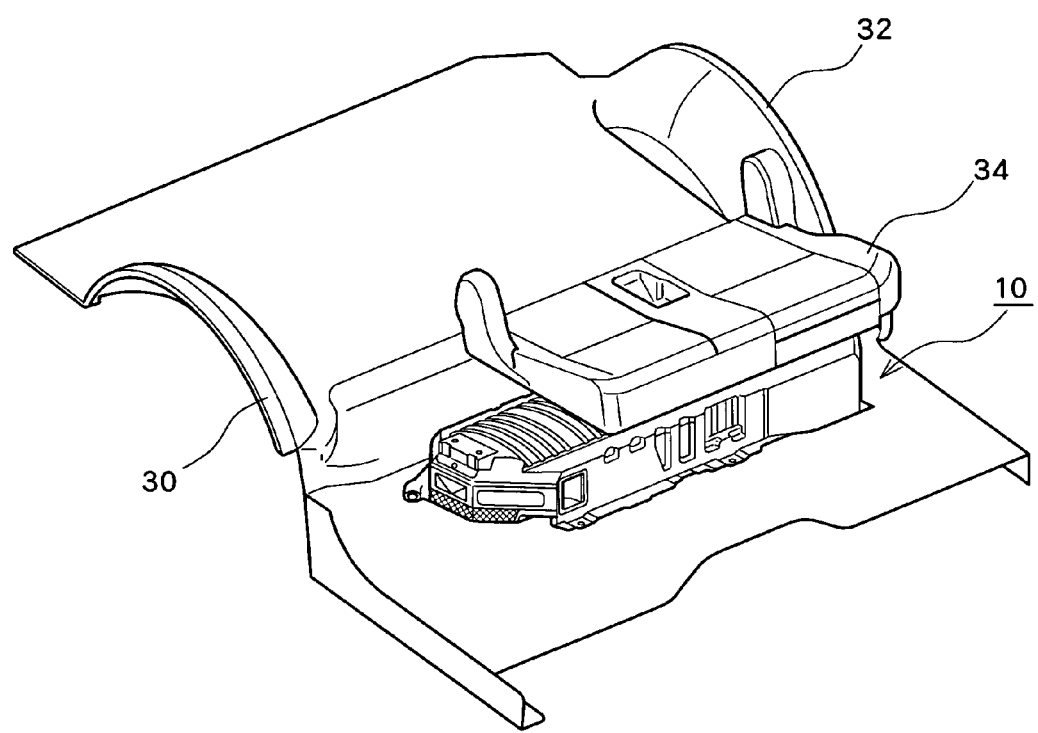
FIG. 6 is a perspective view showing the status of the battery pack mounted on the vehicle.

FIG. 6 is a perspective view showing the battery pack 10 mounted on the vehicle. The battery pack 10 is located at a position below a bearing surface of a vehicle rear seat 34 and between wheel houses 30, 32 of rear tires. The rear seat 34 is collapsible. In a folded state, the rear seat 34 can integrally enlarge a luggage space. When baggage, and the like, is placed on the rear seat 34, the load of the baggage is exerted on the upper case 12 of the battery pack 10, as well. However, the upper case 12 of the battery pack 10 is formed into a curve or a surface protruding in the vertically upward direction. Accordingly, the resistance to load from above is enhanced, and downsizing or collapse of the chamber space, which would otherwise be caused by the load, is prevented, so that the battery stack 20 can be protected. Moreover, the desired cooling characteristic of the battery stack 20 can be maintained.

Although the embodiment of the present invention has been described thus far, the present invention is not limited to the embodiment. Other embodiments of the present invention are also feasible within the technical scope of the invention.

For instance, in the present embodiment, the cooling fan 15, the fan relay 22, and the main relay (−) 24 are disposed in the first equipment region 10a as shown in FIG. 3. Regardless of the weight of the cooling fan 15, the main relay (−) may be disposed in the second equipment region 10c. Alternatively, the main relay (+) 28 or the register 26, which are located in the second equipment region 10c, maybe located in the first equipment region 10a. In short, the essential requirement is to place the cooling fan 15 and the control module 17, which are the principal sources of weight, on respective sides of the battery stack 20 in consideration of distribution of weights of remaining devices.

The combination of devices to be placed in the first equipment region 10a and the second equipment region 10c is illustrated below:

<First Pattern>

Disposed in the first equipment region 10a: a cooling fan, and a cooling fan relay Disposed in the second equipment region 10c: a control module, a register, a main relay (+), a main relay (−), and a pre-charge relay <Second Pattern>

Disposed in the first equipment region 10a: a cooling fan, a cooling fan relay, a main relay (+), and a main relay (−)

Disposed in the second equipment region 10c: a control module, a register, and a pre-charge relay <Third Pattern>

Disposed in the first equipment region 10a: a cooling fan, a fan rely, and a pre-charge relay Disposed in the second requirement region 10c: a control module, a register, a main relay (+), and a main relay (−)

<Fourth Pattern>

Disposed in the first equipment region 10a: a cooling fan

Disposed in the second equipment region 10c: a control module, a fan relay, a main relay (+), a main relay (−), a register, and a pre-charge relay Although in the present embodiment the bead portions 12a are formed in the upper case 12, it may be the case that only a curve is formed in the upper case 12 without formation of the bead portions 12a.

In the present embodiment, the cooling air is arranged so as to flow from the lower portion to the upper portion of the battery stack 20. However, the cooling air may also be arranged so as to flow from the upper portion to the lower portion of the battery stack 20. In any event, the upper case 12 forms the chamber space for use with cooling air in the upper portion of the battery stack 20, and the distribution of flow rate of the cooling air supplied to the chamber space 22 can be regulated by means of the curve of the upper case 12.

Further, in the present embodiment, the centroid of the battery pack 10 is adjusted to the center of the same by means of the first equipment region 10a and the second equipment region 10c. However, the centroid of the battery pack 10 can be understood to be arbitrarily adjusted by means of an increase or decrease in the weights of the devices in the first equipment region 10a or the second equipment region 10c. This signifies that the centroid achieved when the battery pack 10 is mounted on the vehicle 1 can be adjusted to a desired position. Arbitrary adjustment of the centroid according to the type of the vehicle 1 on which the battery pack 10 is to be mounted, or the like, is also feasible.

What is claimed is:

1. A battery pack mounted on a vehicle, the vehicle having a left side, a right side, a front side, and a back side, the vehicle having a widthwise direction extending from the left side of the vehicle to the right side of the vehicle, and a longitudinal center line extending from a center of the front side of the vehicle to a center of the back side of the vehicle, the battery pack having a length greater than a width, the battery pack comprising:
    a battery stack; and
    an equipment region,
    wherein the battery pack is formed of a single battery case having an upper case and a lower case;
    wherein the equipment region is formed from a first box and a second box,
    wherein the first box includes a fan configured to supply a cooling medium for adjusting the temperature of the battery stack;
    wherein a length direction of the battery pack is parallel to the widthwise direction of the vehicle;
    wherein the battery stack, the first box, and the second box are arranged in the length direction of the battery pack, and the length direction extends from the first box disposed on a side of the battery stack to the second box disposed on an opposite side of the battery stack;
    wherein a weight of the first box and a weight of the second box are essentially equal to each other to balance the weight of the battery pack over a weight centroid of the battery pack; and
    wherein the weight centroid of the battery pack is located on the longitudinal center line of the vehicle.

2. The battery pack according to claim 1, wherein the second box includes a control module configured to control charging/discharging operations of the battery stack.

3. The battery pack according to claim 2, wherein the first box further includes a relay associated with the fan.

4. The battery pack according to claim 2, wherein the first box further includes a relay associated with a first pole of the battery stack, and the second box further includes a relay associated with a second pole of the battery stack.

5. The battery pack according to claim 1 wherein the second box includes a control module configured to control operation of the fan.

* * * * *